United States Patent [19]
Shimazaki

[11] Patent Number: 4,903,931
[45] Date of Patent: Feb. 27, 1990

[54] LIFTER FOR AUTOMOTIVE SEAT

[75] Inventor: Mitsuo Shimazaki, Akishima, Japan

[73] Assignee: Tachi-S Company, Ltd., Tokyo, Japan

[21] Appl. No.: 304,715

[22] Filed: Feb. 1, 1989

[30] Foreign Application Priority Data

Jun. 30, 1988 [JP] Japan .............................. 63-87020[U]
Jun. 30, 1988 [JP] Japan .............................. 63-87021[U]

[51] Int. Cl.$^4$ ........................................... F16M 13/00
[52] U.S. Cl. ..................................... 248/421; 248/422; 296/65.1; 297/339
[58] Field of Search ............... 248/421, 422, 423, 157, 248/161, 394, 396; 297/339, 347, 348; 296/65.1

[56] References Cited

U.S. PATENT DOCUMENTS

| | | | |
|---|---|---|---|
| 3,912,215 | 10/1975 | Reinmoller et al. ............ | 248/422 X |
| 4,513,937 | 4/1985 | Langmesser, Jr. et al. .... | 248/396 X |
| 4,648,575 | 3/1987 | Kawade .......................... | 248/422 X |
| 4,720,070 | 1/1988 | Nishino .......................... | 248/422 X |
| 4,738,427 | 4/1988 | Nishino .......................... | 248/422 X |
| 4,787,594 | 11/1988 | Ikegaya et al. ................. | 248/422 X |

Primary Examiner—Ramon O. Ramirez
Attorney, Agent, or Firm—Browdy and Neimark

[57] ABSTRACT

A lifter for an automotive seat, comprising a drive assembly including a long forward link member and a short rearward link member, and an operation mechanism including a drive shaft, a housing rotatably provided on the drive shaft, a gear provided in the housing, the gear being connected to the drive shaft, and a pair of first and second pawl members rotatably pivoted in the housing, with such arrangement that either of those pawl members is selectively brought to engagement with the gear by means of a switch-over cam. An operation lever is equipped with the housing, and both drive assembly and operation mechanism are operatively connected together. Thus, repeated reciprocal rotation of the operation lever attains an easy adjustment of the seat at a desired higher or lower level in a swinging manner, which permits a small rotation range of the operation lever.

7 Claims, 7 Drawing Sheets

LIFTER FOR AUTOMOTIVE SEAT

BACKGROUND OF THE INVENTION

1. Field of the Invention

The present invention relates to a lifter for adjustably raising or lowering a seat of automobile, and is particularly directed to a drive and operation mechanism of the lifter.

2. Description of the Prior Art

A variety of lifters have been invented and used for automotive seats, and most of them are actuated by rotation of an operation lever to raise and lower the seat cushion of the seat. For example, known is the lifter disclosed in the Japanese Laid-Open Patent Publication No. 57-37030. This prior art is of such construction that, when in use, the operation lever is drawn out of a housing for increasing its length and then vertically rotated for causing the vertical displacement of the seat cushion. Therefore, the lifter operation is effected easily by applying a small force upon such extended operation lever. According to the prior art, however, the housing and operation lever are formed in a mutually integral reation, and in particular, the housing is directly connected to a drive shaft in spline connecting manner, the drive shaft being adapted for imparting a rotational force applied on the operation lever to a drive mechanism so as to adjustably move the seat frame in a vertical direction. Consequently, for raising the seat to the highest level, the operation lever needs to be rotated at over 45 degrees, or rather, as the case may be, it needs to be rotated at over 180 degrees, and an undesired, abnormal rotational angle is required for the operation lever. In that case, further, since the operation lever is disposed at the lateral side of the seat cushion and adjacent to the floor of automobile, the rotation range of the lever is limited within at most 180 degrees and thus can never be rotated around at 360 degrees.

In general, an ideal rotation range of the operation lever for this kind of lifter is approx. 45 degrees above and below a non-use horizontal position of the lever, which is a most comfortable design for operation of lever at the side of an occupant on the seat, who is to operate the lever with his or her seating posture.

Certainly, the prior art suggests the extendability of the operation lever and the provision of springs for helping to give a drive force towards the link members, in order to reduce the operation force required to rotate the drive shaft and associated mechanisms. But, the structure results in a rather complicated mechanism and the undesired rotation range problem associated with the operation lever remains.

SUMMARY OF THE INVENTION

In view of the above drawbacks, it is a first purpose of the present invention to provide an improved lifter for an automotive seat which permits adjustments of the height of the seat by rotating the operation lever within a small rotation range so that the adjustments are effected easily and comfortably for an occupant on the seat.

To attain such purpose, the present invention comprises a drive shaft adapted to impart a drive force to a drive assembly, a housing equipped with an operation lever, which is rotatably provided on the drive shaft, a gear provided within the housing, the gear being connected via a non-reversible brake device to the drive shaft, and a pair of first and second pawl members, each being rotatably provided in the housing, such that the first pawl member is engaged with one side of the gear and the second pawl member is engaged with the other side of the gear. In operation, with either of the first and second pawl members being engaged with the gear, the operation lever is rotated so as to cause the rotation of both gear and drive shaft, thereby imparting a drive force via the drive shaft to the drive assembly and effecting the adjustment of the height of the seat.

Accordingly, the two pawl members are firmly engaged with the gear in one rotational direction of the gear, while on the other side, they are easily disengageable from the gear in an opposite rotational direction to that one rotational direction, and thus, such bilateral engageable/disengageable state of the pawl members permits a repeated reciprocal rotation of the operation lever within a small rotation range thereof so as to raise or lower the seat at a desired high or low level. This does not require a great operation force for rotating the operation lever, and allows adjustment for raising far higher or lowering far lower the seat by the rotation of the lever within a small rotation range thereof.

It is a second purpose of the present invention to improve a seating condition of the seat in conjunction with the foregoing lifter.

To this end, in accordance with the present invention, a long forward link member is rotatably provided at the forward part of a seat frame of the seat, while a short rearward link member is rotatably provided at the rearward part of the seat frame, and those link members are operatively connected with the abovementioned drive assembly and further are moved vertically in a coordinated, interlocking relation with each other by the rotation of the operation lever.

Accordingly, the synchronized rotation of the long and short link members produces the swingingly raising and lowering of the seat, whereupon the seat is raised and lowered, giving an arcuate movement trace. Thus, an occupant feels a more comfortable seating state during his or her adjustment of the seat height.

DETAILED DESCRIPTION OF PREFERRED EMBODIMENTS OF THE INVENTION

Figure 1:
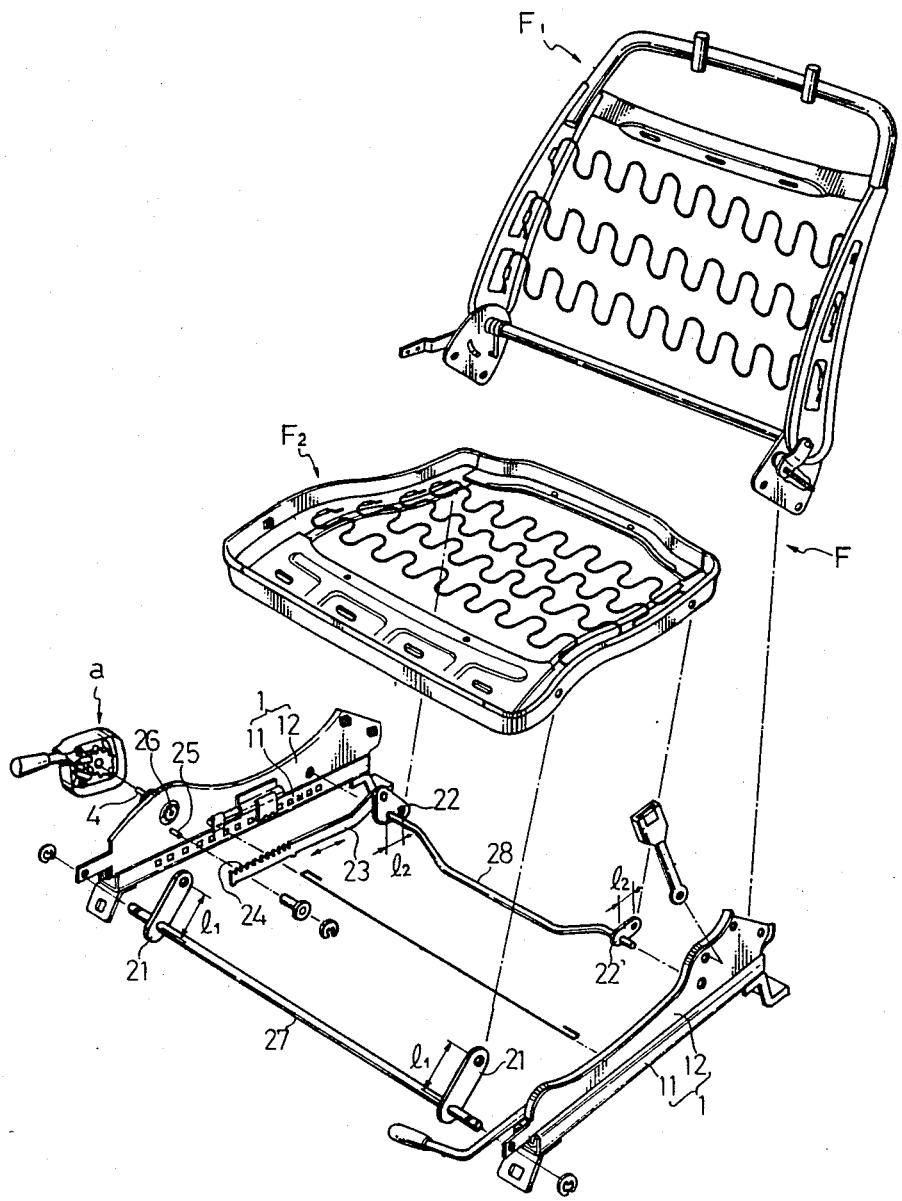
FIG. 1 is an exploded perspective view of a seat frame and slide rail device, in which a lifter is provided in accordance with the present invention.

Referring to FIG. 1, a seat frame (F) and a slide rail device (1) are illustrated, both of which are adapted for use in an automotive seat. The seat frame (F) is composed of a seat back frame (F1) and a seat cushion frame (F2). The slide rail device (1), as shown, is constructed by a pair of spaced-apart slide rails each comprising an upper rail (12) and a lower rail (11), the upper rail (12) being slidably fitted in the lower one (11), thereby permitting the the upper rail (12) to be movable forwardly and backwardly along the lower rail (11).

Figure 2:
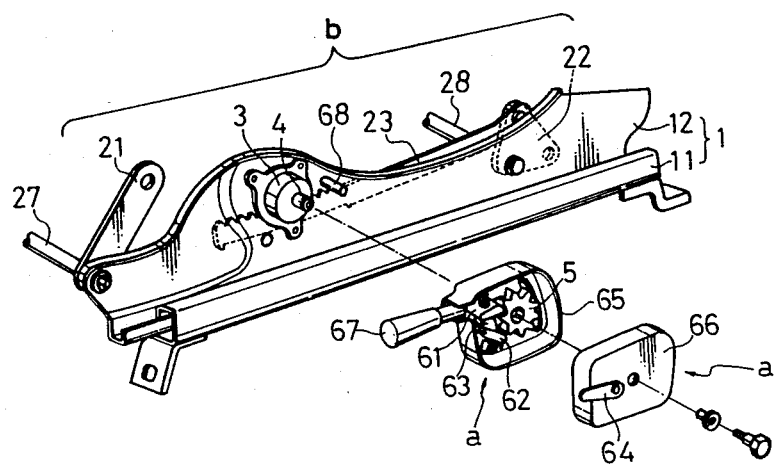
FIG. 2 is an exploded perspective view of the slide rail device, showing a principal part of the present invention.

Reference is now particularly made to FIG. 2, in which one-side part of the slide rail device (1) is illustrated where a principal portion of a lifter is mounted in accordance with the present invention. As will become apparent hereinafter, the lifter is essentially formed by an operation mechanism (a) and a drive assembly (b), and it is to be noted that the operation mechanism (a) is operatively connected via a non-reversible brake device (3) to the drive assembly (b) and that the drive assembly (b) is actuated by the operation mechanism (a) so as to raise or lower the seat cushion frame (F2). It is further noted that the upper rail (12) of the slide rail device (1) is formed in a manner upstanding relatively high from the lower rail (11), whereby a wide area is defined in the lateral wall of the upper rail (12), where the foregoing elements of the lifter are mounted.

Figure 5:
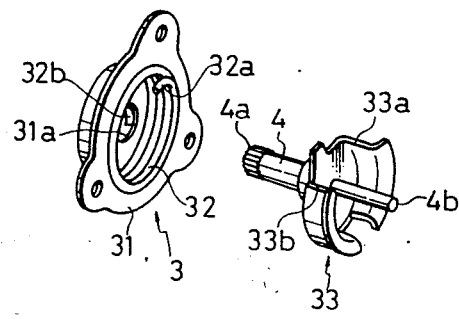
FIG. 5 is an exploded perspective view of a non-reversible brake device which is employed by way of example for the lifter.
Figure 6:
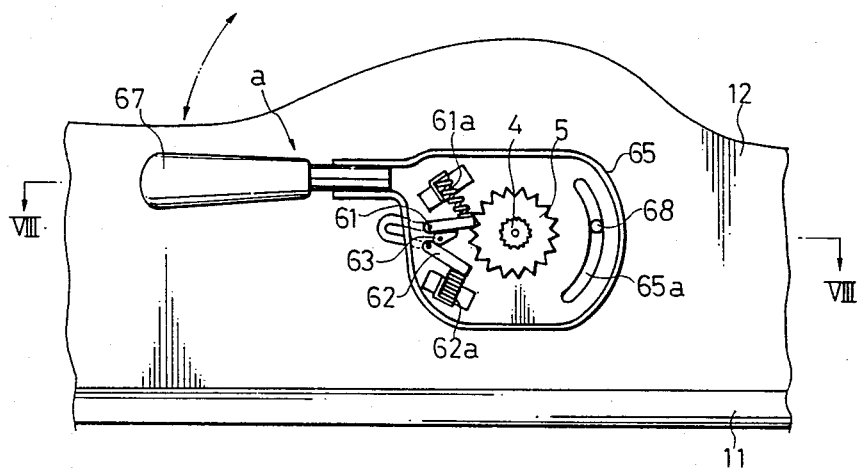
FIG. 6 is a sectional view of an operation mechanism of the lifter, which shows the state wherein the operation mechanism is to be rotated upwardly.

Referring to FIG. 5, the drive assembly (b) is comprised of a drive shaft (4) which is rotatably inserted through the forward part of the upper rail (12), the arrangement of the drive shaft (4) being such that its one end, which extends inwardly of the upper rail (12), is formed with a spline part (4a), and its other end (4b) (as best seen in FIG. 5), extends externally of the upper rail (12). A pinion gear (26) is fixed at such other end (4b) of the drive shaft (4). A generally triangular rearward link member (22) which is, at its rearward lower vertex point, rotatably connected to a crank shaft (28) which is secured rotatably to the paired upper rails (12)(12), extending therebetween. A connecting rod (23) has a rearward end which is pivotally, rotatably connected to the forward lower vertex point of the rearward link member (22). The connecting rod (23) is at its forward end part, slidably supported on a support roller (25) and further has, formed there, a rack portion (24) which is in a meshed engagement with the pinion gear (26). A forward link member (21) has upper and lower ends which are respectively connected to the forward part of the seat frame (20) and that of the upper rail (12) in a pivotally rotatable manner. The support roller (25) is provided on the lateral wall of the upper rail (12), projecting outwardly thereof and being free to rotate.

Turning to review of FIG. 1 in this context, the forward link member (21) is also disposed at the other-side part of the slide rail device (1), and a pair of the forward link members (21)(21) are each at its lower end fixed on a rod (27) which is rotatably secured to the forward end portions of the paired upper rails (11), extending therebetween. As shown, both of the two forward link members (21)(21) are inclined at a proper angle in a direction inwardly of the slide rail device (1). Designation (22'), at such other-side part of the slide rail device (1), denotes a elongated rearward link member which is rotatably connected to the crank shaft (28), located at the side opposed to the above-stated triangular rearward link member (22). Thus, it is seen that, between the upper rail (12) and seat cushion frame (F2), the paired forward link members (21)(21) and the rearward ones (22)(22') are provided, forming a vertically rotatable linkage of the lifter, and it should be noted that the length (l1) of the forward link members (21)(21) is greater than that (l2) of the rearward link members (22)(22').

Figure 7:
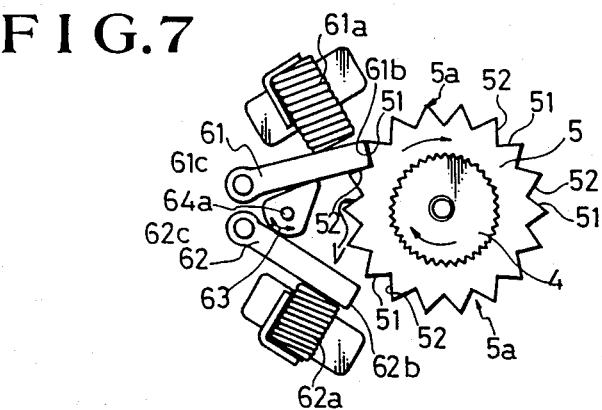
FIG. 7 is a partially enlarged view of the operation mechanism in the FIG. 6.
Figure 8:
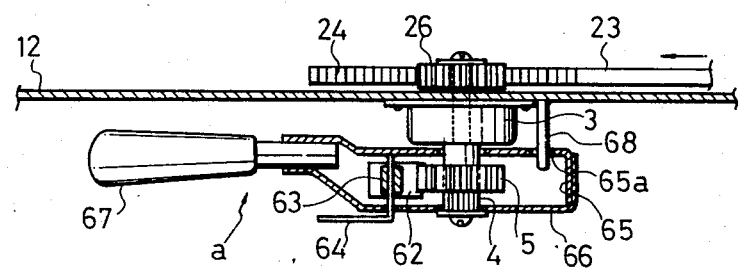
FIG. 8 is a sectional view taken along with the line VII—VII in the FIG. 6.
Figure 9:
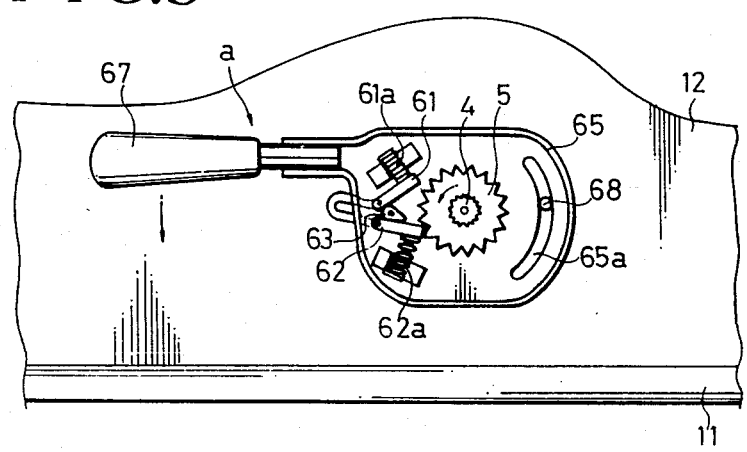
FIG. 9 is a sectional view of the operation mechanism of the lifter, showing the state wherein the operation mechanism is to be rotated downwardly.

Referring now to FIG. 1 and 6 through 9, the abovementioned operation mechanism (a) is of such construction that it comprises a gear (5) which is at its center hole secured to the spline part (4a) of the drive shaft (4) in a spline connecting manner, a housing (65) which is at its center hole (not shown) rotatably supported on the drive shaft (4) such that the housing (65) per se is free to rotate independently about the drive shaft (4), an operation lever (67) integrally provided with the housing (65), the operation lever (67) being normally positioned generally horizontally relative to the upper rail (12), a lid member (66) secured upon the housing (65) for covering the opened side thereof, a pair of first and second pawl members (61)(62), both of them being mounted pivotally in the housing (65) in such a manner that the first pawl member (61) is rotatably pivoted at its rear end (61c) and urged by a first spring (61a) in a direction wherein the forward free end (61b) thereof is engaged with one of the teeth (5a) of the gear (5), and on the other hand, the second pawl member (62) is likewise pivoted at its rear end (62c) and urged by a second spring (62a) in a direction opposite to that of the first pawl member (61); namely, in a direction wherein the free end (62b) of the second pawl member (62) is engaged with one of the teeth (5a) of the gear (5). In this connection, as best seen in FIG. 7, the gear (5) is so formed that the angle of the valley (v) in each of the teeth (a) assumes 90 degrees, whereby the forward end (61b) of the first pawl member (61) is abutted against one side (51) of the teeth (5a), whereas, as understandable from FIG. 9, the forward end (62b) of the second pawl member (62) is to be abutted against the other side (52) of the teeth (5a). Accordingly, with this structure, the first pawl member (61) is locked at the side (51) of the teeth (5a) against rotation, but, in contrast, the same member (61) is rotatable upwards at the other side (52) of the teeth (5a) since the forward end part of the first pawl member (61) is placed upon such other side (52) and pushed thereon from above by the elastic first spring (61a), as can be seen in FIG. 7. On the contrary, the second pawl member (62) is locked at the other side (52) of the teeth (5a) against rotation while being rotatable downwards at the side (51) thereof, as can be seen in FIG. 9. This means that, in the case of FIG. 7, the upward rotation of the operation lever (67) results in the simultaneous rotation of both housing (65) and gear (5) so as to cause rotation of the drive shaft (4), and after having been rotated upwardly, the operation lever (67) is permitted to be rotated downwardly independent of the gear (5) because while the operation lever (67) is being rotated down (so is the housing (65)), the first pawl member (61), by the reason that it is unlocked or disengageable state with regard to the teeth (5a) of the gear (5) as stated above, is caused to turn around the gear (5), riding over one or several teeth (5a) in a clicking and sliding manner. The same goes for the second pawl member (62), which is, however, moved in a reverse fashion as compared with that first pawl member (61), as will be described later. Therefore, the first pawl member (61) serves to permit clockwise rotation of the drive shaft (4) by the upward rotation of the operation lever (67), and the second pawl member (62) serves to permit counterclockwise rotation of the drive shaft (4) by the downward rotation of the lever (67).

A switch-over cam (63) of a generally sector shape is rotatably secured at the pin (64a), the switch-over cam (63) being connected with a lever (64) provided on the lid (66) in order that the rotation of the lever (53) causes the switch-over cam (63) to engage or disengage either of the first and second pawl members (61)(62) into or out of the teeth (5a) of the gear (5). The sector shape of the cam (63) serves to facilitate the ease of switching rotative motion of the lever (64) so that the switch-over operation may be effected with a small force.

The non-reversible brake device (3), as best shown in FIG. 5; is a conventional type of device used commonly in this kind of lifter. In this device (3), a coil spring (32), which has first and second securing parts (32a)(32b), is pressingly accommodated within the inner circular wall of an outer casing (31) and an inner casing (33) is fitted in the outer casing (31). The inner casing (33) has, formed therein, first and second cut-away parts (33a)(33b) so that the first and second securing parts (32a)(32b) are respectively abutted against those first and second cut-away parts (33a)(33b). The above-mentioned drive shaft is penetrated and fixed in the inner casing (33) and further, the spline part (4a) of the drive shaft (4) extends through the hole (31a) of the outer casing (31) for spline connection with the center hole of the gear (5) as described previously (see FIG. 1).

Designation (65a) denotes an arcuate slit perforated in the housing (65). Also, designation (68) denotes a guide pin which is fixed on the outer side of the lateral wall of the upper rail (12), projecting therefrom and passing through the arcuate slit (65a) in a manner slidable therealong. This provides a limit against the vertical rotation of the operation mechanism (a).

Now, the operation of the above-described lifter according to the present invention will be set forth as below, with reference to FIG. 3 and 6 through 9.

Figure 3:
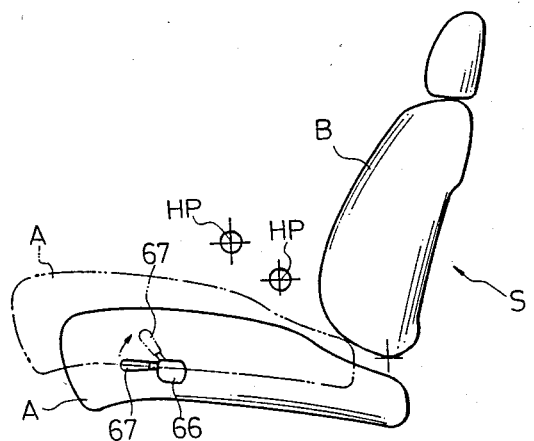
FIG. 3 is a side view of an automotive seat in which an operation mechanism of the lifter is provided.
Figure 4:
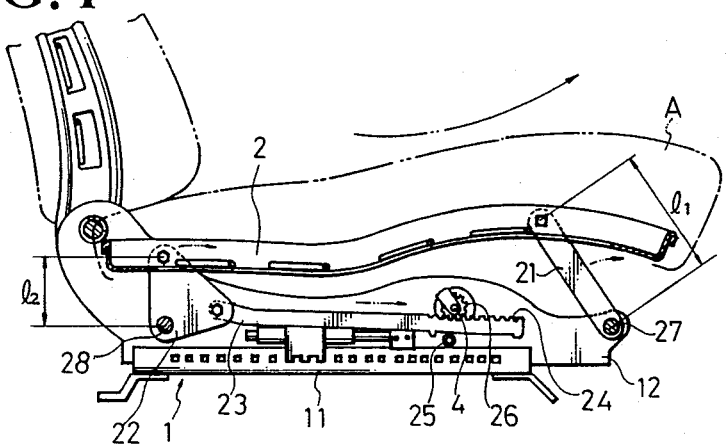
FIG. 4 is a sectional view of the seat in the FIG. 3.

As shown in FIG. 3, the aforementioned seat frame (F) is incorporated in a seat (S), with the seat back and seat cushion frames (F1)(F2) being disposed in a seat back (B) and seat cushion (A) respectively. As is apparent, the seat cushion (A) is to be raised or lowered by use of the above-described lifter, and when it is desired to raise the seat cushion (A), an occupant on the seat has to rotate the operation lever (67) upwardly, in which case, prior to doing so, the lever (64) associated with the switch-over cam (63) is necessarily turned up to cause the switch-over cam (63) to bring the first pawl member (61) into engagement with the gear (5), keeping the second pawl member (62) away from the gear (5), as in FIG. 7. In that state, it is observed that the switch-over cam (63), at its arcuate edge, presses downwardly the second pawl member (62) away from the gear (5), against the urging force of the second spring (62a), while on the other hand, the first pawl member (61) is urged into engagement with one of the teeth (5a). Then, the operation lever (67) is rotated upwardly as indicated by the phantom line in FIG. 3, which simultaneously causes the clockwise rotation of the gear (5) and further simultaneously causes the rotation of the pinion gear (26) via the drive shaft (4). By the rotation of the pinion gear (26), the connecting rod (23) is caused to move forwardly in the arrow direction as shown in FIG. 4, due to the pinion-rack engagement between the pinion gear (26) and rack portion (24) of the connecting rod (23), whereupon the rearward link member (22) is rotated about the crank shaft (28) in the shown arrow direction, with the result that all of the forward link members (21)(21) and rearward link members (22)(22') are caused to rotate coordinately in a sense to rotatively stand up in the arrow direction, and thus, the seat cushion frame (2) or seat cushion (A) is raised in a swinging way as indicated by the curved arrow. Therefore, as can be understood in FIG. 3, the seat cushion (A) is displaced forwardly and backwardly as indicated by the phantom line, and the buttocks point (HP) of an occupant seated on the seat cushion (A) is displaced as illustrated.

For raising the seat cushion (A) further, the operation lever (67) is rotated downwardly to the original horizontal position, during which the lever (67) is permitted to rotate about and independent of the drive shaft (4) because of the easily disengageable state of the first pawl member (61) against the gear (5), which is understandable from FIG. 7 as well as the previous description, and then, rotated again upwardly, thereby causing further rotation of the drive shaft (4) which in turn causes further actuation of the foregoing drive assembly (b) so as to raise the seat cushion (A) higher. Hence, the repeated reciprocal, vertical rotation of the operation lever (67) may achieve the desired high level of the seat cushion (A). In this respect, preferably the rotation range of the operation lever (67) is set approximately 45 degrees from the non-use horizontal position up to the maximum upward rotation limit.

When it is desired, reversely, to lower the seat cushion (A), the lever (64) of the switch-over cam (63) is turned down to cause the cam (63) to bring the second pawl member (62) into engagement with the gear (5) and keeping the first pawl member (61) away from the gear (5). Then, the operation lever (67) is rotated downwardly from its non-use initial horizontal position in the arrow direction as in FIG. 9, which causes the simultaneous rotation of the pinion gear (26) via the drive shaft (4) in a counterclockwise direction. This counterclockwise rotation of the pinion (26) causes the rearward movement of the connection rod (23) so as to rotate downwards the four link members (21)(21)(22)(22'), whereby the seat cushion (A) is lowered. Naturally, the operation lever (67), which is now disposed at a lowest point from its initial horizontal position, may be rotated back (upwardly) to the horizontal normal position, without rotation of the drive shaft (4), as the second pawl member (62) stands in unlocked or disengageable state with regard to the side (52) of the gear (5) as mentioned above. Thus, the repeated reciprocal, vertical rotation of the operation lever (67), in this instance, may attain the desired low level of the seat cushion (A). In this case, also, the rotation range of the lever (67) is preferably set at approximately 45 degrees from the horizontal position down to the maximum downward rotation limit.

From the above description, it is appreciated that, (i) the provision of the first and second pawl members (61)(62) is effective in reducing the rotation range of the operation lever (67), hence permitting an ideal rotation range of the lever (67); namely, about 45 degrees above or below the normal non-use horizontal position thereof, and further no great force is required to rotate the operation lever (67) for raising or lowering the seat cushion (A), and that (ii) the synchronized rotation of the long and short link members (21)(21)(22)(22') produces the swingingly raising and lowering of the seat cushion (A), which represents an arcuate movement trace as indicated in the curved arrow in FIG. 4, and thus, gives a more comfortable seating state to an occupant on the seat (S) during his or her adjustment of the seat height.

While having been described above, it should be understood that the present invention is not limited to the illustrated embodiment, but other various modifications, replacements and additions may structurally be possible without departing from the spirit and scope of the appended claims for the invention.

What is claimed is:

1. A lifter for an automotive seat, in which the seat includes a seat frame and slide rail device, comprising:
   a drive means disposed between said seat frame and slide rail, said drive means including a link means;
   a drive shaft adapted to impart a drive force to said drive means;
   a housing equipped with an operation lever, said housing being rotatably provided on said drive shaft;
   a gear provided in said housing and fixedly connected via a non-reversible brake device to said drive shaft;
   a first pawl member rotatably provided in said housing, said first pawl member being disposed such as to be engageable with one side of said gear, to thereby permit said gear to be rotated in a first direction;
   a second pawl member rotatably provided in said housing, said second pawl member being disposed such as to be engageable with the other side of said gear, to thereby permit said gear to be rotated in a second direction opposite to said first direction;
   a switch-over cam provided in said housing, said switch-over cam being adapted to bring either of said first and second pawl member into engagement with said gear,
   whereby rotation of said operation lever causes said drive shaft to rotate in either of said first and second directions and thus impart said drive force therefrom to said drive means so as to adjustably raise or lower said seat.

2. The lifter as defined in claim 1, wherein said link means of said drive means comprises a pair of forward link members and a pair of rearward link members, wherein said pair of forward link members are rotatably connected to a forward portion each of said seat frame and slide device and said pair of rearward link members are rotatably connected to a rearward portion each of said seat frame and slide device, and wherein said forward link members are formed longer than said rearward link members, whereby said seat frame is moved in a swinging manner.

3. The lifter as defined in claim 1, wherein said gear is formed with a plurality of teeth, each of said teeth having a valley which assumes a 90-degree angle between its one side and other side, and wherein it is so arranged that said first pawl member is, at its free end part, to be engaged with said one side of said gear, while said second pawl member is, at its free end part, to be engaged with said other side of said gear.

4. The lifter as defined in claim 1, wherein said first and second pawl members are each at its rear end part rotatably pivoted in said housing, wherein said first and second pawl members are each urged by a spring in a direction wherein its forward free end part is to be engaged with said gear, and wherein said switch-over cam is disposed between said first and second pawl members, whereby operation of said switch-over cam brings either of said first and second pawl members into engagement with said gear.

5. The lifter as defined in claim 1, wherein a lever is provided on a upper surface of said housing such that said lever is exposed externally of said housing, and wherein said lever is integrally connected to said switch-over cam, so that operation of said lever causes either of said first and second pawl members into engagement with said gear.

6. The lifter as defined in claim 1, wherein said drive means further includes a pinion gear fixed on said drive gear and a connecting rod whose one end is connected with said link means and whose other end is formed with a rack portion, and wherein said pinion gear is meshed with said rack portion of said connecting rod.

7. The lifter as defined in claim 1, wherein said housing has an arcuate slit perforated therein, said arcuate slit being defined along a circle whose center is disposed at a center of said housing, and wherein a guide pin is provided in said housing such that it passes through said arcuate slit, so that the rotation of said housing and thus of said operation lever is limited by said guide pin and arcuate slit at a certain rotation range.

* * * * *

UNITED STATES PATENT AND TRADEMARK OFFICE
CERTIFICATE OF CORRECTION

PATENT NO. : 4,903,931
DATED : February 27, 1990
INVENTOR(S) : Mitsuo SHIMAZAKI

It is certified that error appears in the above-identified patent and that said Letters Patent is hereby corrected as shown below:

On the face of the Patent:

[73] Assignee:     Delete "Tachi-S Company, Ltd.", insert therefor -- Tachi-S Co., Ltd. --

Signed and Sealed this

Twenty-fourth Day of December, 1991

Attest:

HARRY F. MANBECK, JR.

*Attesting Officer*     *Commissioner of Patents and Trademarks*